United States Patent [19]

Cunningham et al.

[11] Patent Number: 5,485,583
[45] Date of Patent: Jan. 16, 1996

[54] SYSTEM FOR CONTROLLING DATA TRANSFER BY SETTING AND DECREMENTING A COUNTER BASED ON THE NUMBER OF ERROR CORRECTION BITS AND TRANSFER BIT RATE RESPECTIVELY

[75] Inventors: Howard L. Cunningham, Huntsville; Robert J. Hanby, Athens, both of Ala.

[73] Assignee: Motorola, Inc., Schaumburg, Ill.

[21] Appl. No.: 933,439

[22] Filed: Aug. 20, 1992

[51] Int. Cl.$^6$ ............................ G06F 11/00; G06F 11/08; G06F 11/30
[52] U.S. Cl. ........................... 395/845; 395/375; 395/854; 395/185.02; 371/37.7; 364/265.1; 364/266.5; 364/267.9; 364/268.1; 370/7
[58] Field of Search ....................................... 395/275, 250, 395/425, 375; 371/37.7

[56] References Cited

U.S. PATENT DOCUMENTS

| | | | |
|---|---|---|---|
| 3,975,712 | 8/1976 | Hepworth et al. | 340/147 |
| 4,040,014 | 8/1977 | Gehrking | 340/147 |
| 4,375,103 | 2/1983 | Arneth et al. | 375/109 |
| 4,794,620 | 12/1988 | Moore et al. | 375/8 |
| 5,109,500 | 4/1992 | Iseki et al. | 395/425 |
| 5,179,661 | 1/1993 | Copeland, III et al. | 395/250 |

*Primary Examiner*—Thomas C. Lee
*Assistant Examiner*—Rehana Krick
*Attorney, Agent, or Firm*—Nancy R. Gamburd; Wayne J. Egan

[57] ABSTRACT

A data terminal (10) determines when to set a request to send ("RTS") signal (51) to a logical LOW state by determining when an internal counter (13) reaches a count value of zero. The counter is driven by the transmit clock signal (55) of an associated modem (70).

20 Claims, 1 Drawing Sheet

15,485,583

SYSTEM FOR CONTROLLING DATA TRANSFER BY SETTING AND DECREMENTING A COUNTER BASED ON THE NUMBER OF ERROR CORRECTION BITS AND TRANSFER BIT RATE RESPECTIVELY

FIELD OF THE INVENTION

This application relates to methods for controlling signals including, but not limited to, a method for controlling a request to send (hereinafter "RTS") signal.

BACKGROUND OF THE INVENTION

Software control of bit-oriented serial data communications over half-duplex communications channels is common. As is known, such applications typically include a software-controlled terminal coupled to a synchronous modem via an interlace channel including an RTS signal, wherein the RTS signal controls the transmission status of the modem. In such an arrangement, the communications software needs to wait a period of time after writing the last data character to a bit-oriented serial communications controller (hereinafter "SCC") integrated circuit, such as the Zilog 8530, until the trailing cyclic redundancy check (hereinafter "CRC") characters and trailing flag characters have been sent from the SCC and any attached data communications equipment before setting the RTS signal to LOW, or "off."

In such an arrangement, after the software writes the last character to the SCC, the SCC generates a processor interrupt indicating that the end of message (hereinafter "EOM") has occurred. At this point, the software must wait the necessary amount of time before setting RTS off to prevent corrupting the trailing characters which validate the entire message. The amount of time is determined by the data character bit rate, namely, from 2400 bits per second ("bps") to 64,000 bps and is typically the time required to send 30 bits of data. At 2400 bps, 30 bit times equals 12.5 milliseconds. At 64,000 bps, the time required to send 30 bits of data equals 0.47 milliseconds. As the communications software does not know the data bit rate, waiting the correct amount of time is difficult.

There are two methods currently used to address this problem.

A first method, known as the "compute bound processing loop" approach, is described as follows. When the software receives the EOM interrupt, it enters a compute bound processing loop to delay the necessary amount of time before setting RTS to LOW. A typical compute loop is as follows:

Initialize a loop counter to a large value.
Top of Loop:
Decrement the loop counter.
If the loop counter is greater than zero, go to Top of Loop.
Set RTS off.

There are several problems with this approach, as follows. First, while the computer is in this compute bound loop, the computer is not available to perform other tasks. This is a very inefficient use of resources. Second, if the communications software is executed on multiple processors with different processing speeds, the loop counter cannot be set appropriately for all processor speeds. On a fast processor, the loop counter should be larger than on a slower processor. Third, if the communications software is executing at varying data character bit rates, the loop counter cannot be set appropriately for all bit rates. For a slow data bit rate, the loop counter should be larger than for a faster data bit rate.

A second method, known as the "hardware timer counter" approach, is described as follows. When the software receives the EOM interrupt, it initializes an external hardware timer counter to a specified value. The hardware timer counter decrements to zero at a rate determined by an external fixed oscillator. When the timer counter reaches zero, a hardware interrupt is generated. In response to this hardware interrupt, the software sets RTS to LOW.

There are several problems with the "hardware timer counter," as follows. First, the computer may not have a hardware timer counter available without incurring the extra cost of adding one. Second, the hardware timer counter which may be available in the computer may be the wrong frequency to achieve the timing granularity required. Third, the hardware timer counters which are available in the computer may be clocked at an unknown frequency. Fourth, if the communications software is executing at varying unknown data bit rates, the hardware timer counter cannot be set appropriately for all bit rates.

Thus, there is a need for a method for controlling the RTS signal in such an arrangement.

SUMMARY OF THE INVENTION

In an arrangement of a terminal coupled to a modem via a channel including a request to send ("RTS") signal having a HIGH state and a LOW state, the modem coupled to a facility; the terminal including a buffer arranged for sending data bits contained therein to a shift register, the shift register arranged for forming an output bit stream, and a counter; the modem including a modulator arranged for forming modulated data bits based on the output bit stream, a gate arranged for applying the modulated data bits to the facility under control of the RTS signal, a clock arranged for generating a clock signal coupled to the shift register, the counter, and the modulator, the counter arranged for counting downwards in value based on the clock signal, a method for controlling the RTS signal is disclosed. In accordance with the present invention, the method comprises the steps of:

(a) set the RTS signal to HIGH;

(b) send data bits to the buffer;

(c) determine when the buffer becomes empty;

(d) when the buffer becomes empty:

(d1) form an error-check message having a first predetermined number of bits;

(d2) send the error-check message to the shift register;

(d3) form a second predetermined number based on the first predetermined number; and, (d4) send the second predetermined number to the counter;

(e) determine when the counter reaches zero; and, (f) when the counter reaches zero, then set the RTS signal to LOW.

DETAILED DESCRIPTION

Figure 1:
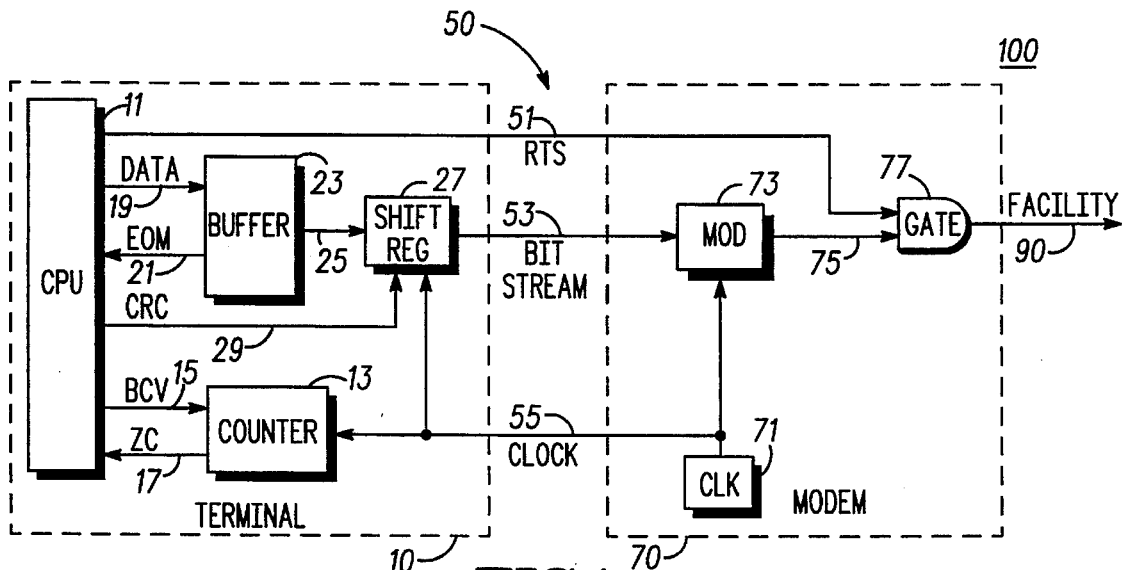
FIG. 1 is a block diagram that shows an arrangement of a terminal 10 coupled to a modem 70 via a channel 50, the arrangement being suitable for demonstrating a first embodiment of a method for controlling a request to send signal, in accordance with the present invention.

Referring now to FIG. 1, there is shown a terminal 10 coupled to a modem 70 via a channel 50, the channel comprising an RTS signal 51, a bit stream 53 and a clock signal 55, and the modem being coupled to a facility 90. The RTS signal 51 includes a logic 1 or HIGH state and a logic 0 or LOW state. The facility 90 may be, for example, a data-transmission-grade telephone line provided by the telephone company. The channel 50 may comprise, for example, the familiar RS-232-type interface. Further, the modem 70 may comprise, for instance, a V.32-type modem arranged to operate at 9600 bits per second.

As shown, the terminal includes a central processor unit (hereinafter "CPU") 11, a buffer 23, a shift register 27, and a counter 13 resident therein. As shown, the state of the RTS signal 51 is controlled by the CPU 11. In the preferred embodiment, the CPU 11 comprises a bit-oriented serial SCC integrated circuit such as, for instance, the Zilog 8530-type, and the counter 13 comprises a hardware timer counter which is part of the SCC integrated circuit.

The CPU 11 is arranged to send data bits to the buffer 23 via the lead 19 (designated "DATA"). The CPU is further arranged to determine when the buffer 23 becomes empty. In the preferred embodiment, this is accomplished by arranging the buffer 23 for generating an EOM interrupt signal when the buffer becomes empty and sending the EOM interrupt signal to the CPU 11 via the lead 21, and by further arranging the CPU 11 for detecting this EOM interrupt signal driven by the buffer via the lead 21.

The buffer 23 is further arranged for sending data bits contained therein to the shift register 27 via the lead 25. The shift register 27, in turn, is arranged for forming an output bit stream and sending the bit stream to the modem 70 via the lead 53 (designated "BIT STREAM").

In the preferred embodiment, the buffer 23 comprises the transmit buffer of the terminal 10 and the shift register 27 comprises the transmit shift register of the terminal 10.

Upon determining that the buffer 23 is empty, the CPU 11 is arranged for forming an appropriate error-check message having a first predetermined number of bits, and for then sending this error check message to the shift register via the lead 29. The CPU 11 is arranged for then forming a second predetermined number based on the number of bits contained in the error check message, namely, the first predetermined number, and for then sending the second predetermined number to the counter via the lead 15. In the preferred embodiment, the error-check message is a CRC-type message; hence, the lead 27 is designated "CRC." A further input to the shift register 27 is the clock signal 55, as provided by the modem 70.

The CPU 11 is coupled to the counter 13 via the leads 15 and 17. The counter 13 is arranged for counting downwards in value based on the clock signal 55, the clock signal 55 being provided by the modem 70. The CPU 11 is arranged for setting the counter 13 to a predetermined bit count value by means of the lead 15 (designated "BCV" for Bit Count Value). The CPU 11 is further arranged to determine when the counter reaches zero count. In the preferred embodiment, this is accomplished by arranging the counter 13 for generating a zero-count (hereinafter "ZC") interrupt and sending it to the CPU 11 via the lead 17 (designated "ZC" for Zero Count), and by further arranging the CPU 11 for detecting this ZC interrupt driven by the counter 13 via the lead 17.

As shown, the modem 70 includes a clock 71, a modulator 73, and a gate 77. The clock 71 generates a clock signal 55, the clock signal being coupled to the modulator 73. The clock signal 55 is further applied to the terminal 10 via the channel 50. From the terminal, the clock signal 55 is distributed to the counter 13 and the shift register 27. In the preferred embodiment, the clock unit 71 comprises the transmit clock of the modem 70 and the clock signal 55 comprises the transmit clock signal of the modem 70.

As shown, the bit stream 53 is input to the modulator 73. The modulator 73, in turn, is arranged for forming modulated data bits based on the bit stream 53. The modulated data bits, in turn, are applied to the gate 77 via the lead 75. The gate 77, in turn, is arranged for applying the modulated data bits to the facility 90 under control of the RTS signal 51.

The arrangement of FIG. 1 operates as follows:

To begin, it is assumed that the terminal 10 wishes to transmit a message containing a predetermined set of data bits such as, for example, a predetermined number of eight-bit data characters, to a remote terminal or host (not shown). As a result, CPU 11 sets the RTS signal 51 to HIGH, thereby enabling the gate 77.

The CPU 11 then sends the data bits to the buffer 23 which, in turn, sends the bits to the shift register 27. The shift register, in turn, clocks the bits to the modulator 73, under control of the clock signal 55, via the channel 50 and the lead 53. The modulator 73, in turn, forms modulated data bits, under control of the clock signal 71, and applies these modulated data bits to the gate 77 via the lead 75. The gate 77, in turn, applies these modulated data bits to the facility 90, for transmission to the remote location.

The CPU 11 then determines when the buffer becomes empty by monitoring the lead 21 for an end of message interrupt signal that is automatically generated by the buffer 23 when the buffer 23 has transmitted all the data bits contained therein to the shift register 27, and thus becomes empty.

When the buffer 23 becomes empty, the buffer generates the end of message interrupt signal, which is detected by the CPU 11 via the lead 21. In response, the CPU 11 executes the following steps:

First, the CPU 11 forms an error-check message having a first predetermined number of bits. In the preferred embodiment this error-check message will be a CRC message, and the first predetermined number is 20. As a result, the error-check message so formed is a CRC message having a length equal to twenty (20) bits. In the preferred embodiment, the CRC message length of 20 bits is equivalent to the length or bit size of the transmit shift register 27. Hence, in the preferred embodiment, the shift register 27 is 20 bits long.

Second, the CPU 11 sends the error-check message to the shift register via the lead 29.

Third, the CPU 11 forms a second predetermined number based on the number of bits contained in the error-check message, namely, the first predetermined number. In the preferred embodiment, the second predetermined number of bits is thirty (30), which is based on the sum of the first predetermined number (equal to 20) and a third predetermined number (equal to 10), wherein the third predetermined number is based on the type of modem 70. Thus, the third predetermined number of 10 is a safety factor which guarantees that the CRC message of length 20 bits will be fully transmitted by the modem 70 before the CPU sets the RTS lead 51 to a logic LOW state, thus causing the gate 77 to be disabled.

Fourth, the CPU 11 sends the second predetermined number to the counter 13 via the lead 15. The counter 13 will thereupon begin counting downwards in value, under control of the clock signal which is applied to the counter via the lead 55.

The CPU 11 then determines when the counter 13 reaches zero by monitoring the lead 17 for a zero count interrupt signal that is automatically generated by the counter 13 when the counter 13 has reached a count equal to zero.

When the counter 13 reaches a zero count, the counter generates the zero count interrupt signal, which is detected by the CPU 11 via the lead 17. In response, the CPU 11 then sets the RTS signal on lead 51 to LOW. As a result, the gate 77 is disabled, thereby preventing the flow of further modulated data signals from lead 75 to the facility 90.

Figure 2:
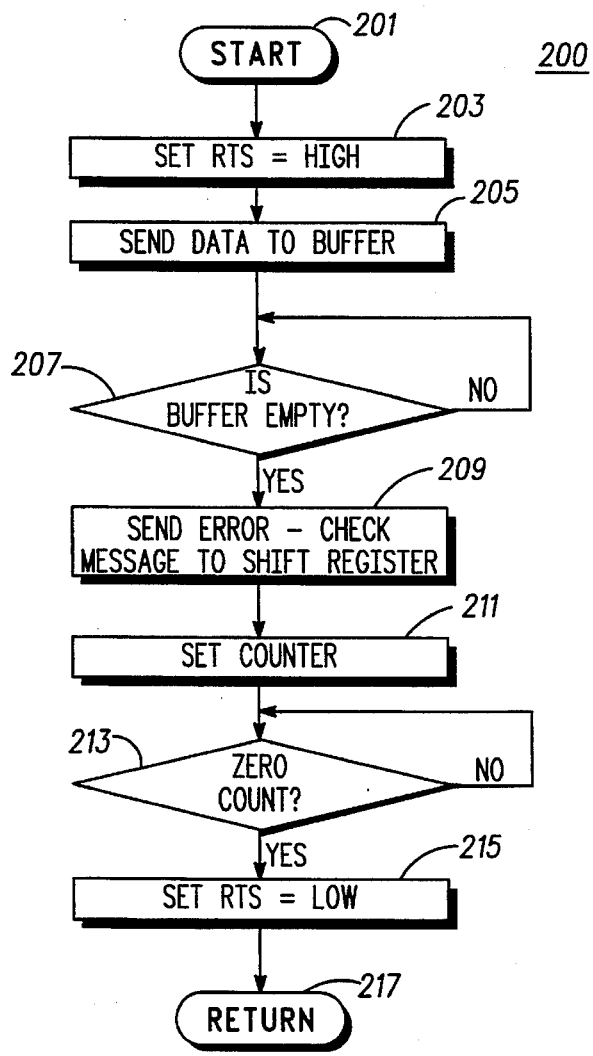
FIG. 2 is a flow diagram for the first embodiment.

FIG. 2 is a flow diagram for the first embodiment. As above, it is assumed that the terminal 10 wishes to transmit data to a remote terminal or host (not shown). The process starts at step 201, and then proceeds to step 203, where it sets the RTS signal to HIGH.

The process then goes to step 205, where it sends the data to the buffer 23.

The process then goes to step 207, where it determines when the buffer 23 becomes empty by monitoring the lead 21 for the presence of an end of message interrupt signal generated by the buffer 23.

When the buffer 23 becomes empty, the determination from step 207 will be positive, and the process then goes to step 209.

In step 209, the process forms an error-check message having a first predetermined number of bits and then sends the error-check message to the shift register. The process then goes to step 211.

In step 211, the process sets the counter 13 by forming a second predetermined number based on the first predetermined number, and then sending the second predetermined number to the counter. The process then goes to step 213.

In step 213, the process determines when the counter 13 reaches a zero count by monitoring the lead 17 for the presence of a zero count interrupt signal generated by the counter 13.

When the counter 13 reaches zero, the determination from step 213 becomes positive, and the process then goes to step 215.

In step 215, the process sets the RTS signal present on the lead 51 to LOW, thus disabling the gate 77 and thereby causing the modem 70 to cease transmitting any modulated data signals that may be present on the lead 75 to the facility 90. The process then returns, step 217.

In the preferred embodiment, the Zilog 8530 SCC is used to fabricate the CPU 11, while the counter 13 comprises a hardware timer counter, designated the "baud rate generator," which is built-into the integrated circuit and which hardware timer 13 can be decremented by the modem transmit clock signal 55 to generate a zero count ("ZC") interrupt signal 17 when the timer counter 13 reaches a zero count value.

The external transmit clock signal 55 provided by the modem 70, which signal operates at the frequency of the bit rate, is therefore utilized to drive the counter 13, the counter being initialized with a predetermined bit count value, so that when the counter 13 reaches a zero value, the RTS signal 51 is set LOW. The bit count value is determined as the length of the transmit shift register 27, plus a "safety factor" which will vary, depending on the type of modem used. For example, in the preferred embodiment, the transmit shift register is 20 bits long, and a safety factor, which works for modems supplied by Universal Data Systems, Inc., is empirically determined to be 10. Hence, the bit count value is set to 30 (20+10=30).

Moreover, a method for controlling a request to send signal, in accordance with the present invention, utilizes the modem transmit clock signal 55 to measure the delay required before setting the RTS signal 51 to LOW. In contrast, as discussed above, previous methods generated the required delay based on a clock whose rate was either unknown, as it was based on the processor execution speed or an external hardware clock, or else fixed, as it did not vary with the data bit rate.

One key advantage of a method for controlling a request to send signal, in accordance with the present invention, as compared with previous methods, is that the time delay as measured between the end of message interrupt signal present on lead 21 to the zero count interrupt signal present on lead 17 is accurately generated as the appropriate number of data bit times, regardless of the speed of the CPU 11, the granularity and/or the variability of any standard hardware timer counters, and the data bit rate. A further advantage is that the processor resource CPU 11 is not needlessly wasted in compute bound loops. A still further advantage is that the RTS signal 51 is controlled more precisely, which improves communications line performance.

While various embodiments of a method for controlling a request to send signal, in accordance with the present invention, have been described hereinabove, the scope of the invention is defined by the following claims.

What is claimed is:

1. In an arrangement of a terminal coupled to a modem via a channel including a request to send ("RTS") signal having a HIGH state and a LOW state, the modem coupled to a facility; the terminal including a buffer arranged for sending data bits contained therein to a shift register, the shift register arranged for forming an output bit stream, and a counter; the modem having a data transmission bit rate, the modem further including a modulator arranged for forming modulated data bits based on the output bit stream, a gate arranged for applying the modulated data bits to the facility under control of the RTS signal for data transmission, a clock arranged for generating a clock signal coupled to the shift register, the counter, and the modulator, the counter arranged for counting downwards in value based on the clock signal, a method for controlling the RTS signal, the method comprising the steps of:

(a) enabling the gate for data transmission by setting the RTS signal to HIGH;

(b) sending data bits to the buffer;

(c) determining when the buffer becomes empty;

(d) when the buffer becomes empty:

(d1) forming an error-check message having a first predetermined number of bits;

(d2) sending the error-check message to the shift register;

(d3) forming a second predetermined number based on the first predetermined number; and, (d4) sending the second predetermined number to the counter;

(e) decrementing the counter at a frequency based on the bit rate:

(f) determining when the counter reaches zero; and, (g) when the counter reaches zero, disabling the gate for data transmission by setting the RTS signal to LOW.

2. The method of claim 1 wherein the second predetermined number further comprises the sum of the first predetermined number and a third predetermined number, and the third predetermined number is based on the modem.

3. The method of claim 1 wherein the step (c) further comprises detecting an end of message ("EOM") interrupt driven by the buffer.

4. The method of claim 1 wherein the step (f) further comprises detecting a zero count ("ZC") interrupt driven by the counter.

5. The method of claim 1 wherein the error-check message is a cyclic redundancy check ("CRC") type.

6. The method of claim 1 wherein steps (a) through step (g) are controlled at least in part by a central processor unit ("CPU") resident in the terminal.

7. The method of claim 6 wherein where the CPU comprises a bit-oriented serial communications controller ("SCC") integrated circuit.

8. The method of claim 7 wherein the counter comprises a hardware timer counter as part of the SCC integrated circuit.

9. The method of claim 1 wherein the channel comprises a RS-232-type interface.

10. The method of claim 1 wherein the first predetermined number is 20 and the second predetermined number is 30.

11. An apparatus arranged for coupling to an arrangement of a terminal coupled to a modem via a channel including a request to send ("RTS") signal having a HIGH state and a LOW state, the modem coupled to a facility; the terminal including a buffer arranged for sending data bits contained therein to a shift register, the shift register arranged for forming an output bit stream, and a counter; the modem having a bit rate for data transmission, the modem further including a modulator arranged for forming modulated data bits based on the output bit stream, a gate arranged for applying the modulated data bits to the facility under control of the RTS signal for data transmission, a clock arranged for generating a clock signal coupled to the shift register, the counter, and the modulator, the counter arranged for counting downwards in value based on the clock signal, the apparatus arranged for controlling the RTS signal in accordance with a predetermined method, the predetermined method comprising the steps of:

(a) enabling the gate for data transmission by setting the RTS signal to HIGH;

(b) sending data bits to the buffer;

(c) determining when the buffer becomes empty;

(d) when the buffer becomes empty:
 (d1) forming an error-check message having a first predetermined number of bits;
 (d2) sending the error-check message to the shift register;
 (d3) forming a second predetermined number based on the first predetermined number;
 (d4) sending the second predetermined number to the counter;

(e) decrementing the counter at a frequency based on the bit rate;

(f) determining when the counter reaches zero; and, (g) when the counter reaches zero, disabling the gate for data transmission by setting the RTS signal to LOW.

12. The apparatus of claim 11 wherein the second predetermined number further comprises the sum of the first predetermined number and a third predetermined number, and the third predetermined number is based on the modem.

13. The apparatus of claim 11 wherein the step (c) further comprises detecting an end of message ("EOM")interrupt driven by the buffer.

14. The apparatus of claim 11 wherein the step (f) further comprises detecting a zero count ("ZC") interrupt driven by the counter.

15. The apparatus of claim 11 wherein the error-check message is a cyclic redundancy check ("CRC") type.

16. The apparatus of claim 11 wherein steps (a) through step (g) are controlled at least in part by a central processor unit ("CPU") resident in the terminal.

17. The apparatus of claim 16 wherein where the CPU comprises a bit-oriented serial communications controller ("SCC") integrated circuit.

18. The apparatus of claim 17 wherein the counter comprises a hardware timer counter as part of the SCC integrated circuit.

19. The apparatus of claim 11 wherein the channel comprises a RS-232-type interface.

20. The apparatus of claim 11 wherein the first predetermined number is 20 and the second predetermined number is 30.

* * * * *